(12) United States Patent
Muta (10) Patent No.: US 7,974,747 B2
(45) Date of Patent: Jul. 5, 2011

(54) VEHICLE AND METHOD FOR CONTROLLING THE SAME

(75) Inventor: Koichiro Muta, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 827 days.

(21) Appl. No.: 11/989,697

(22) PCT Filed: May 23, 2007

(86) PCT No.: PCT/JP2007/060555
§ 371 (c)(1),
(2), (4) Date: Jan. 30, 2008

(87) PCT Pub. No.: WO2008/026355
PCT Pub. Date: Mar. 6, 2008

(65) Prior Publication Data
US 2010/0222949 A1    Sep. 2, 2010

(30) Foreign Application Priority Data
Aug. 28, 2006  (JP) .................................. 2006-230899

(51) Int. Cl.
  *B60L 11/00*  (2006.01)
  *G06G 7/70*  (2006.01)
  *G06F 7/00*  (2006.01)
(52) U.S. Cl. ........................... 701/22; 701/111; 701/112
(58) Field of Classification Search .................. None
See application file for complete search history.

(56) References Cited

U.S. PATENT DOCUMENTS

| 5,844,342 | A | * | 12/1998 | Miyatani et al. ............. 310/114 |
| 6,083,138 | A | * | 7/2000 | Aoyama et al. .................... 477/5 |
| 6,278,195 | B1 | * | 8/2001 | Yamaguchi et al. ......... 290/40 A |
| 6,656,082 | B1 | * | 12/2003 | Yamada et al. .................... 477/5 |
| 6,966,866 | B2 | * | 11/2005 | Ando et al. ........................ 477/4 |
| 7,125,362 | B2 | * | 10/2006 | Beaty et al. ....................... 477/3 |
| 7,292,917 | B2 | * | 11/2007 | Kuang et al. .................... 701/22 |
| 7,658,248 | B2 | * | 2/2010 | Kaya et al. .............. 180/65.265 |
| 7,677,341 | B2 | * | 3/2010 | Tomo ...................... 180/65.265 |
| 2005/0178594 | A1 | * | 8/2005 | Yamauchi et al. ........... 180/65.2 |

FOREIGN PATENT DOCUMENTS

| JP | 2000-125413 | A | 4/2000 |
| JP | 2001-263116 | A | 9/2001 |
| JP | 2003-247438 | A | 9/2003 |
| JP | 2005-184999 | A | 7/2005 |
| JP | 2006-044638 | A | 2/2006 |
| JP | 2007-099086 | A | 4/2007 |

* cited by examiner

Primary Examiner — Khoi Tran
Assistant Examiner — Bao Long Nguyen
(74) Attorney, Agent, or Firm — Kenyon & Kenyon LLP (57) ABSTRACT

When a system stop instruction is issued in the middle of the operation of an engine to stop the engine, the engagement of the gears in a gear mechanism is pressed toward one side. After the engine has stopped, a torque command for a motor connected to a drive shaft is gradually reduced. When the torque command decreases below a threshold value, the system is stopped. In this way, it is possible to prevent generation of vibration of the drive shaft when the system is stopped.

8 Claims, 4 Drawing Sheets

VEHICLE AND METHOD FOR CONTROLLING THE SAME

TECHNICAL FIELD

This is a 371 national phase application of PCT/JP2007/060555 filed 23 May 2007, claiming priority to Japanese Patent Application No. JP 2006-230899 filed 28 Aug. 2006, the contents of which are incorporated herein by reference.

The present invention relates to a vehicle and a method for controlling the same.

BACKGROUND ART

There has been proposed a vehicle of this type including an engine, a planetary gear mechanism, the carrier of the planetary gear mechanism connected to the crankshaft of the engine, the ring gear of the planetary gear mechanism connected to an axle via a gear mechanism, a first motor, the rotating shaft of which is connected to the sun gear of the planetary gear mechanism, and a second motor, the rotating shaft of which is connected to the ring gear of the planetary gear mechanism, wherein when the engine is to be stopped, the first motor outputs a torque that stops the output shaft of the engine at a predetermined rotational position to motor the engine, and the second motor outputs a cancelling torque that cancels the torque outputted as a reaction force to a drive shaft in response to the output of the torque from the first motor (see Patent Document 1, for example). In such a vehicle, in a low rotation speed area in which the rotation speed of the engine is not stable, the second motor outputs a torque set by taking into account the rotational resistance of the engine to prevent the torque shock in the low rotation speed area.

[Patent Document 1] Japanese Patent Laid-Open No. 2000-125413

DISCLOSURE OF THE INVENTION

In general, in the vehicle described above, when the engine is to be stopped, the first motor motors the engine and the second motor outputs a pressing torque that presses the engagement of the gears in the gear mechanism toward one side as well as the cancelling torque described above. In such a vehicle, after the engine has stopped, the pressing torque outputted from the second motor is gradually reduced to prevent noise generation in the gear mechanism. Therefore, if the system is stopped immediately after the engine has been stopped, the torque outputted from the second motor abruptly changes, disadvantageously resulting in vibration.

The vehicle and the method for controlling the same according to the present invention aim to prevent generation of vibration when the system is stopped.

To achieve the above object, the vehicle and the method for controlling the same according to the present invention employs the following approach.

The present invention is directed to a first vehicle. The vehicle includes: an internal combustion engine; a torque output module that is connected to an output shaft of the internal combustion engine and a drive shaft connected to an axle via a gear mechanism, the torque output module outputting torque, while supplying and receiving electric power and mechanical power and outputting a torque as a reaction force to one of the output shaft and the drive shaft, to the other one of the output shaft and the drive shaft; an electric motor capable of supplying and receiving mechanical power to and from the drive shaft; an accumulator unit capable of supplying and receiving electric power to and from the torque output module and the electric motor; and a control module that, when a system stop instruction is issued in the middle of the operation of the internal combustion engine, controls the internal combustion engine and the torque output module in such a way that the output shaft of the internal combustion engine is stopped within a predetermined rotational position range, controls the electric motor in such a way that the sum of a cancelling torque that cancels the torque outputted as the reaction force to the drive shaft in response to the output of the torque from the torque output module to the output shaft of the internal combustion engine and a pressing torque necessary to press the engagement of the gears in the gear mechanism toward one side is outputted from the electric motor, controls the electric motor in such a way that the torque from the electric motor gradually decreases at least after the internal combustion engine has stopped, and stops the system when the torque outputted from the electric motor reaches a predetermined torque.

The first vehicle of the present invention, when the system stop instruction is issued in the middle of the operation of the internal combustion engine, controls the internal combustion engine and the torque output module in such a way that the output shaft of the internal combustion engine is stopped within the predetermined rotational position range, controls the electric motor in such a way that the sum of the cancelling torque that cancels the torque outputted as the reaction force to the drive shaft in response to the output of the torque from the torque output module to the output shaft of the internal combustion engine and the pressing torque necessary to press the engagement of the gears in the gear mechanism toward one side is outputted from the electric motor, controls the electric motor in such a way that the torque from the electric motor gradually decreases at least after the internal combustion engine has stopped, and stops the system when the torque outputted from the electric motor reaches the predetermined torque. Since the system is stopped when the torque from the electric motor reaches a predetermined torque, it is possible to prevent abrupt change in the torque from the electric motor and hence generation of vibration when the system is stopped. The value of the "predetermined torque" includes zero.

The present invention is also directed to a second vehicle. The vehicle includes: an internal combustion engine; a torque output module that is connected to an output shaft of the internal combustion engine and a drive shaft connected to an axle via a gear mechanism, the torque output module outputting torque, while supplying and receiving electric power and mechanical power and outputting a torque as a reaction force to one of the output shaft and the drive shaft, to the other one of the output shaft and the drive shaft; an electric motor capable of supplying and receiving mechanical power to and from the drive shaft; an accumulator unit capable of supplying and receiving electric power to and from the torque output module and the electric motor; and a control module that, when a system stop instruction is issued in the middle of the operation of the internal combustion engine, controls the internal combustion engine and the torque output module in such a way that the output shaft of the internal combustion engine is stopped within a predetermined rotational position range, controls the electric motor in such a way that the sum of a cancelling torque that cancels the torque outputted as the reaction force to the drive shaft in response to the output of the torque from the torque output module to the output shaft of the internal combustion engine and a pressing torque necessary to press the engagement of the gears in the gear mechanism toward one side is outputted from the electric motor, controls the electric motor in such a way that the torque from the electric motor gradually decreases at least after the internal combustion engine has stopped, and stops the system when a predetermined time has passed, the predetermined time being the required time from a predetermined timing after the system stop instruction has been issued to the timing when the torque from the electric motor gradually decreases to a predetermined torque.

The second vehicle of the present invention, when the system stop instruction is issued in the middle of the operation of the internal combustion engine, controls the internal combustion engine and the torque output module in such a way that the output shaft of the internal combustion engine is stopped within the predetermined rotational position range, controls the electric motor in such a way that the sum of the cancelling torque that cancels the torque outputted as the reaction force to the drive shaft in response to the output of the torque from the torque output module to the output shaft of the internal combustion engine and the pressing torque necessary to press the engagement of the gears in the gear mechanism toward one side is outputted from the electric motor, controls the electric motor in such a way that the torque from the electric motor gradually decreases at least after the internal combustion engine has stopped, and stops the system when the predetermined time has passed, the predetermined time being the required time from the predetermined timing after the system stop instruction has been issued to the timing when the torque outputted from the electric motor gradually decreases to the predetermined torque. Since the system is stopped when a predetermined time has passed, the predetermined time being the time required for the torque from the electric motor to gradually decrease to a predetermined torque, it is possible to prevent abrupt change in the torque from the electric motor and hence generation of vibration when the system is stopped. The value of the "predetermined torque" includes zero.

Each of such first and second vehicles of the present invention may further include a blocking module for blocking the supply of the electric power from the accumulator unit to the electric motor, and the control module may control the blocking module in the system stop operation in such a way that the supply of the electric power from the accumulator unit to the electric motor is blocked. In this way, the system can be stopped by blocking the supply of the electric power to the electric motor.

In the first and second vehicles of the present invention, the torque output module may include a three shaft-type power input output module that is connected to three shafts, the output shaft of the internal combustion engine, the drive shaft, and a rotating shaft, the three shaft-type power input output module supplying and receiving mechanical power, based on the mechanical power supplied and received to and from two shafts of the three shafts, to and from the remaining shaft, and an electric motor capable of supplying and receiving mechanical power to and from the rotating shaft. Alternatively, the torque output module may be a pair-rotor motor including a first rotor connected to the output shaft of the internal combustion engine and a second rotor connected to the drive shaft, the pair-rotor motor rotating in response to the relative rotation between the first and second rotors.

The present invention is also directed to a method for controlling a first vehicle. The first vehicle includes an internal combustion engine, a torque output module that is connected to an output shaft of the internal combustion engine and a drive shaft connected to an axle via a gear mechanism, the torque output module outputting torque, while supplying and receiving electric power and mechanical power and outputting a torque as a reaction force to one of the output shaft and the drive shaft, to the other one of the output shaft and the drive shaft, an electric motor capable of supplying and receiving mechanical power to and from the drive shaft, and an accumulator unit capable of supplying and receiving electric power to and from the torque output module and the electric motor. The method includes the steps of: when a system stop instruction is issued in the middle of the operation of the internal combustion engine, controlling the internal combustion engine and the torque output module in such a way that the output shaft of the internal combustion engine is stopped within a predetermined rotational position range, and controlling the electric motor in such a way that the sum of a cancelling torque that cancels the torque outputted as the reaction force to the drive shaft in response to the output of the torque from the torque output module to the output shaft of the internal combustion engine and a pressing torque necessary to press the engagement of the gears in the gear mechanism toward one side is outputted from the electric motor; controlling the electric motor in such a way that the torque from the electric motor gradually decreases at least after the internal combustion engine has stopped; and stopping the system when the torque outputted from the electric motor reaches a predetermined torque.

In the method for controlling the first vehicle of the present invention, when the system stop instruction is issued in the middle of the operation of the internal combustion engine, the internal combustion engine and the torque output module are controlled in such a way that the output shaft of the internal combustion engine is stopped within a predetermined rotational position range; the electric motor is controlled in such a way that the sum of the cancelling torque that cancels the torque outputted as the reaction force to the drive shaft in response to the output of the torque from the torque output module to the output shaft of the internal combustion engine and the pressing torque necessary to press the engagement of the gears in the gear mechanism toward one side is outputted from the electric motor; the electric motor is controlled in such a way that the torque from the electric motor gradually decreases at least after the internal combustion engine has stopped; and the system is stopped when the torque outputted from the electric motor reaches the predetermined torque. Since the system is stopped when the torque from the electric motor reaches a predetermined torque, it is possible to prevent abrupt change in the torque from the electric motor and hence generation of vibration when the system is stopped.

The present invention is also directed to a method for controlling a second vehicle. The second vehicle includes an internal combustion engine, a torque output module that is connected to an output shaft of the internal combustion engine and a drive shaft connected to an axle via a gear mechanism, the torque output module outputting torque, while supplying and receiving electric power and mechanical power and outputting a torque as a reaction force to one of the output shaft and the drive shaft, to the other one of the output shaft and the drive shaft, an electric motor capable of supplying and receiving mechanical power to and from the drive shaft, and an accumulator unit capable of supplying and receiving electric power to and from the torque output module and the electric motor. The method includes the steps of: when a system stop instruction is issued in the middle of the operation of the internal combustion engine, controlling the internal combustion engine and the torque output module in such a way that the output shaft of the internal combustion engine is stopped within a predetermined rotational position range, and controlling the electric motor in such a way that the sum of a cancelling torque that cancels the torque outputted as the reaction force to the drive shaft in response to the output of the torque from the torque output module to the output shaft of the internal combustion engine and a pressing torque necessary to press the engagement of the gears in the gear mechanism toward one side is outputted from the electric motor; controlling the electric motor in such a way that the torque from the electric motor gradually decreases at least after the internal combustion engine has stopped; and stopping the system when a predetermined time has passed, the predetermined time being the required time from a predetermined timing after the system stop instruction has been issued to the timing when the torque from the electric motor gradually decreases to a predetermined torque.

In the method for controlling the second vehicle of the present invention, when the system stop instruction is issued in the middle of the operation of the internal combustion engine, the internal combustion engine and the torque output module are controlled in such a way that the output shaft of the internal combustion engine is stopped within the predetermined rotational position range; the electric motor is controlled in such a way that the sum of the cancelling torque that cancels the torque outputted as the reaction force to the drive shaft in response to the output of the torque from the torque output module to the output shaft of the internal combustion engine and the pressing torque necessary to press the engagement of the gears in the gear mechanism toward one side is outputted from the electric motor; the electric motor is controlled in such a way that the torque from the electric motor gradually decreases at least after the internal combustion engine has stopped; and the system is stopped when the predetermined time has passed, the predetermined time being the required time from the predetermined timing after the system stop instruction has been issued to the timing when the torque outputted from the electric motor gradually decreases to the predetermined torque. Since the system is stopped when a predetermined time has passed, the predetermined time being the time required for the torque from the electric motor to gradually decrease to a predetermined torque, it is possible to prevent abrupt change in the torque from the electric motor and hence generation of vibration when the system is stopped.

BEST MODE FOR CARRYING OUT THE INVENTION

Figure 1:
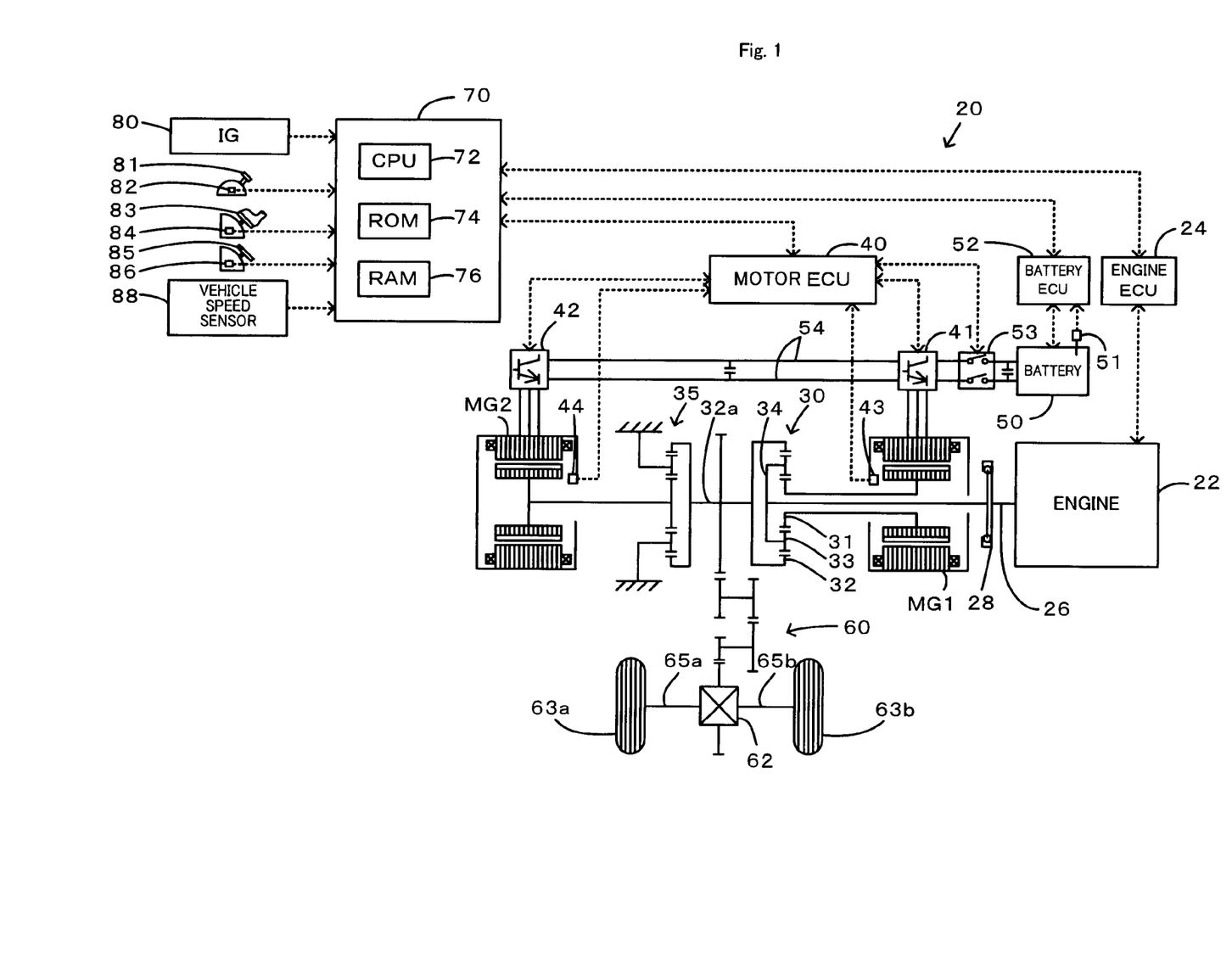
FIG. 1 is a configuration diagram showing the schematic configuration of a hybrid vehicle 20, which is an embodiment of the present invention.

One mode of carrying out the invention is discussed below as a preferred embodiment. FIG. 1 schematically illustrates the construction of a hybrid vehicle 20 in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole power output apparatus.

The engine 22 is an internal combustion engine that uses a hydrocarbon-based fuel, such as gasoline and light oil, to output mechanical power. The engine 22 is driven under fuel injection control, ignition control, intake air flow adjustment control and the like performed by an engine electronic control unit (hereinafter referred to as "engine ECU") 24, to which various sensors for detecting the operation state of the engine 22 input signals. The engine ECU 24 communicates with the hybrid electronic control unit 70 in such a way that the engine ECU 24 not only drives and controls the engine 22 using a control signal from the hybrid electronic control unit 70 but also outputs data on the operation state of the engine 22 as required, such as the crank position from a crank position sensor. (not shown) that detects the rotational position of the crankshaft 26, to the hybrid electronic control unit 70.

Each of the motors MG1 and MG2 is configured as a known synchronous motor generator that can be driven not only as a generator but also as an electric motor, and supplies and receives electric power to and from a battery 50 via inverters 41 and 42. An electric power line 54 connects the battery 50 to the inverters 41 and 42 via a system main relay 53. The electric power line 54 is formed of a positive electrode bus line and a negative electrode bus line that the inverters 41 and 42 share, and configured in such a way that the electric power generated by one of the motors MG1 and MG2 can be consumed by the other motor. Therefore, the battery 50 is either charged by the electric power produced by the motor MG1 or MG2, or discharged to the motor MG1 or MG2 that is short of electric power. When the motors MG1 and MG2 are balanced in terms of electric power generation and consumption, the battery 50 is neither charged nor discharged. Both the motors MG1 and MG2 are driven and controlled by a motor electronic control unit (hereinafter referred to as "motor ECU") 40. The motor ECU 40 receives signals necessary to drive and control the motors MG1 and MG2, such as signals from rotational position detection sensors 43 and 44 for detecting the rotational positions of the rotors of the motors MG1 and MG2, and phase currents detected by current sensors (not shown) and applied to the motors MG1 and MG2, while the motor ECU 40 outputs switching control signals to the inverters 41, 42 and the system main relay 53. The motor ECU 40 communicates with the hybrid electronic control unit 70 in such a way that the motor ECU 40 not only drives and controls the motors MG1 and MG2 using a control signal from the hybrid electronic control unit 70 but also outputs data on the operation state of the motors MG1 and MG2 as required to the hybrid electronic control unit 70.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 2:
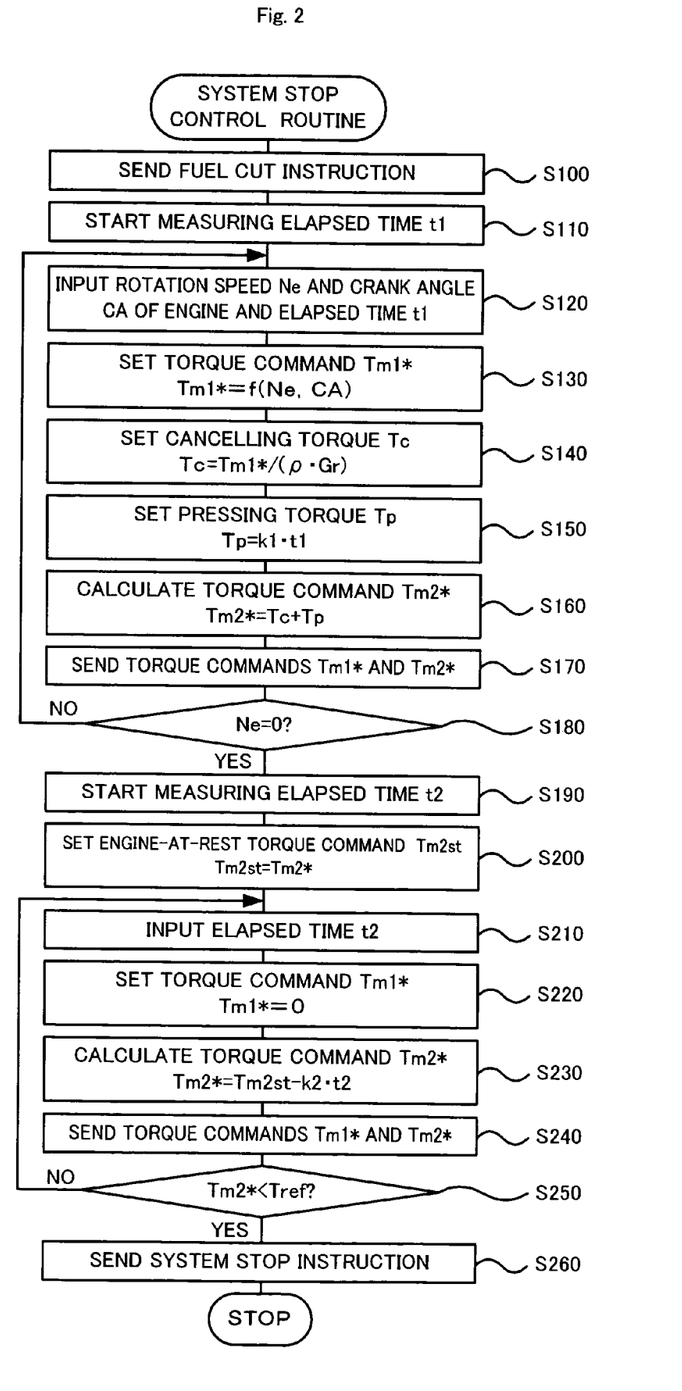
FIG. 2 is a flowchart showing an example of the system stop control routine executed by a hybrid electronic control unit 70 in the embodiment.

The operation of the thus configured hybrid vehicle 20, particularly, the operation when a system stop instruction is issued in the middle of the operation of the engine 22 will be described below. FIG. 2 is a flowchart showing an example of the system stop control routine executed by the hybrid electronic control unit 70. This routine is executed when the ignition switch 80 is turned off, that is, when the system stop instruction is issued in the middle of the operation of the engine 22. The following description will be made with reference to the case where the hybrid vehicle 20 is at rest.

When the system stop control routine is executed, the CPU 72 in the hybrid electronic control unit 70 first executes the process of sending a fuel cut instruction to the engine ECU 24 to stop the fuel supply to the engine 22 and stop the ignition (step S100). The engine ECU 24 that has received the fuel cut instruction executes the process of stopping the fuel injection control and the ignition control over the engine 22.

Then, a timer (not shown) is used to start measuring elapsed time t1 (step S110), and the rotation speed Ne and the crank angle CA of the engine 22 and the elapsed time t1 are inputted (step S120). It is noted that the rotation speed Ne of the engine 22 is calculated based on the signal from a crank position sensor (not shown) attached to the crankshaft 26, and then inputted through communication from the engine ECU 24. It is also noted that the crank angle CA is obtained by converting the crank position detected by the crank position sensor (not shown) into an angle relative to a reference angle, and then inputted through communication from the engine ECU 24.

Figure 3:
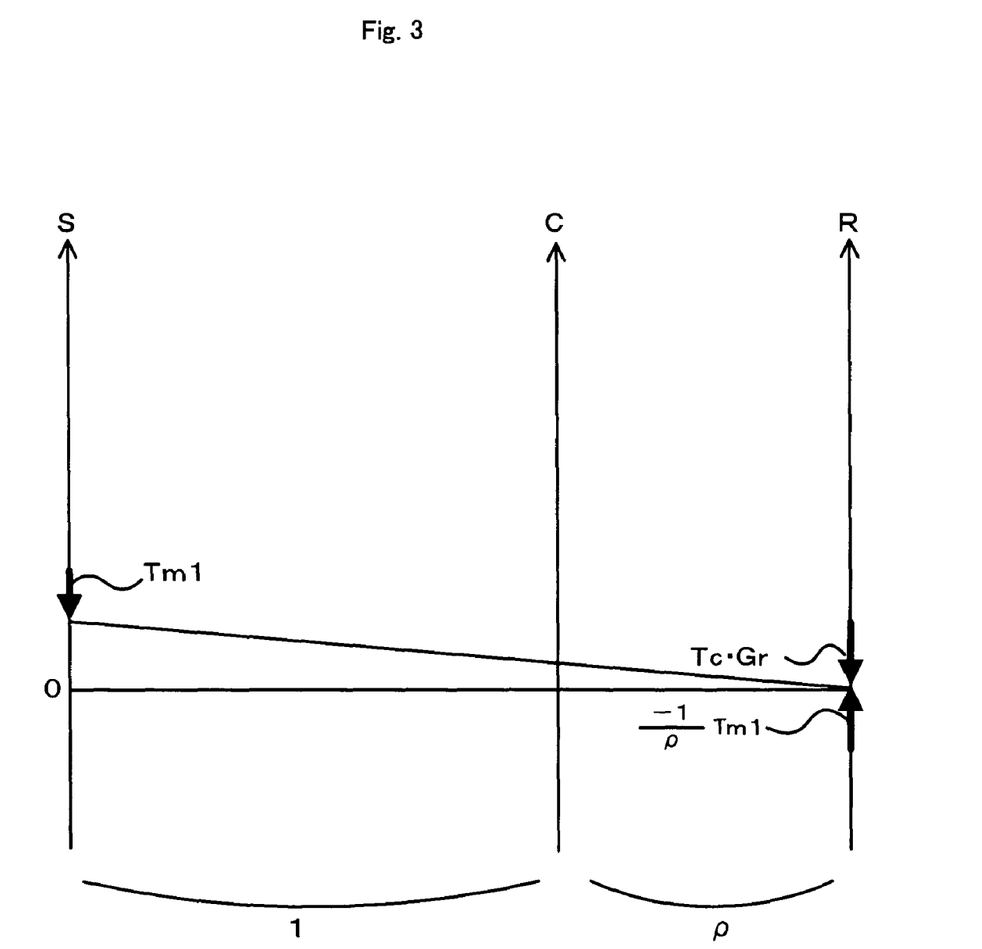
FIG. 3 is an alignment chart for explaining the mechanical relationship between the rotation speed and the torque in a power distribution and integration mechanism 30.
Figure 4:
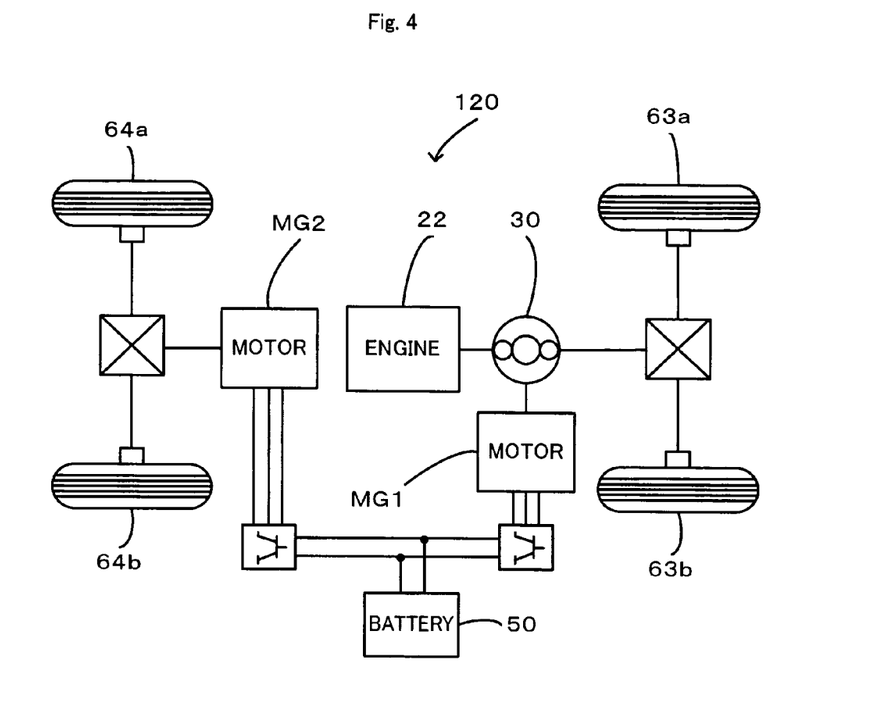
FIG. 4 is a configuration diagram showing the schematic configuration of a hybrid vehicle 120 in a variation.

Then, based on the rotation speed Ne and the crank angle CA of the engine 22, a torque for smoothly reducing the rotation speed Ne of the engine 22 and stopping the engine 22 in the crank angle range within which the next start operation of the engine 22 is easily carried out is set as a torque command Tm1* for the motor MG1 (step S130). The thus set torque command Tm1* for the motor MG1, the gear ratio ρ of the power distribution and integration mechanism 30, and the gear ratio Gr of the reduction gear 35 are used in the following equation (1) to set a cancelling torque Tc that cancels the torque outputted, when the motor MG1 is driven according to the torque command Tm1*, as the reaction force to the ring gear shaft 32a as the drive shaft (step S140). The equation (1) is the mechanical relationship between the cancelling torque and the torque command Tm1* in consideration of the rotating elements in the power distribution and integration mechanism 30. FIG. 3 is an alignment chart showing the mechanical relationship between the rotation speed and the torque in the rotating elements in the power distribution and integration mechanism 30 when the rotation speed Ne of the engine 22 is decreasing. In FIG. 3, the axis S on the left represents the rotation speed of a sun gear 31, which is equal to the rotation speed Nm1 of the motor MG1. The axis C represents the rotation speed of a carrier 34, which is equal to the rotation speed Ne of the engine 22. The axis R represents the rotation speed Nr of a ring gear 32, which is equal to the rotation speed Nm2 of the motor MG2 divided by the gear ratio Gr of the reduction gear 35. The equation (1) can be easily derived from the alignment chart. The two thick arrows on the axis R represent the torque acting on the ring gear shaft 32a, the torque derived from the torque Tm1 outputted from the motor MG1, and the cancelling torque Tc, which is outputted from the motor MG2 for cancelling the torque acting on the ring gear shaft 32a, multiplied by the gear ratio Gr.

$$Tc = Tm1*/(\rho \cdot Gr) \qquad (1)$$

Then, a torque that gradually increases in proportion to the elapsed time t1 with a proportionality constant k1 is set as a pressing torque Tp that presses the engagement of the gears in a gear mechanism 60 toward one side (step S150). The pressing torque Tp that gradually increases is set to prevent noise from being generated when gears in the gear mechanism 60 hit each other due to the play between the gears. The proportionality constant k1 is set in such a way that such noise is not generated.

After the cancelling torque Tc and the pressing torque Tp have been thus set, the sum of the cancelling torque Tc and the pressing torque Tp is set as the torque command Tm2* for the motor MG2 (step S160), and the thus set torque commands Tm1* and Tm2* for the motors MG1 and MG2 are sent to the motor ECU 40 (step S170). The motor ECU 40 that has received the torque commands Tm1\* and Tm2\* performs switching control on the switching elements in the inverters 41 and 42 in such a way that the motor MG1 is driven according to the torque command Tm1\* and the motor MG2 is driven according to the torque command Tm2\*.

After the torque commands Tm1\* and Tm2\* for the motors MG1 and MG2 are sent; the processes from the step S120 to the step S180 are repeated until the rotation speed Ne of the engine 22 becomes zero (step S180). By thus setting the torque command Tm1\* for the motor MG1 to be the torque that smoothly reduces the rotation speed Ne of the engine 22 and stops the engine 22 in the crank angle range within which the next start operation of the engine 22 is easily carried out and controlling the motor MG1 accordingly, the rotation speed Ne of the engine 22 can be smoothly reduced and the engine 22 can be stopped at a crank angle at which the next start operation of the engine 22 can be quickly carried out. Furthermore, by setting the torque command Tm2\* for the motor MG2 to be the sum of the cancelling torque Tc and the pressing torque Tp and controlling the motor MG2 accordingly, it is possible to stop the engine 22 at a predetermined crank angle while preventing noise generation in the gear mechanism 60.

After the rotation speed Ne of the engine 22 has become zero (step S180), a timer (not shown) is used to start measuring elapsed time t2 from the point when the rotation speed Ne of the engine 22 has become zero (step S190), and the torque command Tm2\* for the motor MG2 when the rotation speed Ne of the engine 22 has become zero is set as an engine-at-rest torque command Tm2st (step S200).

Then, the elapsed time t2 is inputted (step S210). The torque command Tm1\* for the motor MG1 is set to zero (step S220). The torque command Tm2\* for the motor MG2 is set to be the torque that decreases from the engine-at-rest torque command Tm2st in proportion to the elapsed time t2 with a proportionality constant k2 (step S230). The thus set torque commands Tm1\* and Tm2\* for the motors MG1 and MG2 are sent to the motor ECU 40 (step S240). The processes from the step S210 to the step S250 are repeated until the torque command Tm2\* for the motor MG2 is reduced below a threshold value Tref (step S250). In the process in the step S230, the torque command Tm2\* for the motor MG2 that gradually decreases from the engine-at-rest torque command Tm2st is set to prevent noise generation in the gear mechanism 60, and the proportionality constant k2 is set in such a way that such noise is not generated. In the process in the step S250, the threshold value Tref may be the upper limit of the torque range within which the driver of the vehicle does not feel unpleasant vibration generated on the ring gear shaft 32a as the drive shaft when the torque from the motor MG2 is abruptly changed from the threshold value Tref to zero, or may be a torque close to the upper limit. The threshold value Tref may be set to zero.

When the torque command Tm2\* for the motor MG2 is reduced below the threshold value Tref (step S250), the driver of the vehicle does not feel unpleasant vibration generated on the ring gear shaft 32a when the system is stopped. It is therefore judged that the system may be stopped and a system stop instruction is sent to the motor ECU 40 (step S260). This routine is then terminated. The motor ECU 40 that has received the system stop instruction turns off the system main relay 53 to block the supply of the electric power from the battery 50 to the inverters 41 and 42. Since the system is thus stopped when the torque command Tm2\* for the motor MG2 is reduced below the threshold value Tref, it is possible to prevent vibration from being generated on the ring gear shaft 32a as the drive shaft when the system is stopped.

According to the hybrid vehicle 20 of the embodiment described above, since the system is stopped when the torque command Tm2\* for the motor MG2 gradually decreases below the threshold value Tref, it is possible to prevent vibration form being generated on the ring gear shaft 32a as the drive shaft when the system is stopped.

In the hybrid vehicle 20 of this embodiment, although the pressing torque Tp set in the step S150 is a torque that increases with the elapsed time t1, the pressing torque Tp may be set to a substantially fixed value throughout the elapsed time t1 provided that a certain amount of noise generated when gears in the gear mechanism 60 hit each other due to the play between the gears is tolerated. In this case, the pressing torque T is desirably set to be a torque that minimizes the noise generated when gears in the gear mechanism 60 hit each other due to the play between the gears.

In the hybrid vehicle 20 of this embodiment, although the system is stopped when the torque command Tm2\* for the motor MG2 is reduced below the threshold value Tref, the system may be stopped when time tref has passed (2 seconds later, for example), the time tref being the estimated required time from a predetermined timing after the system stop instruction has been issued (the timing when the rotation speed Ne of the engine 22 becomes zero, for example) to the timing when the torque from the motor MG2 gradually decreases to a predetermined torque (the threshold value Tref, for example).

In the hybrid vehicle 20 of this embodiment, the system main relay 53 provided on the power line 54 between the battery 50 and the inverters 41, 42 is turned off to stop the system. Since the electric power supplied from the battery 50 to the motors MG1 and MG2 may be blocked to stop the system, system main relays may be provided on the power lines from the inverters 41 and 42 to the motors MG1 and MG2 and these system main relays may be turned off. Alternatively, the gates of the inverters 41 and 42 may be blocked.

Figure 5:
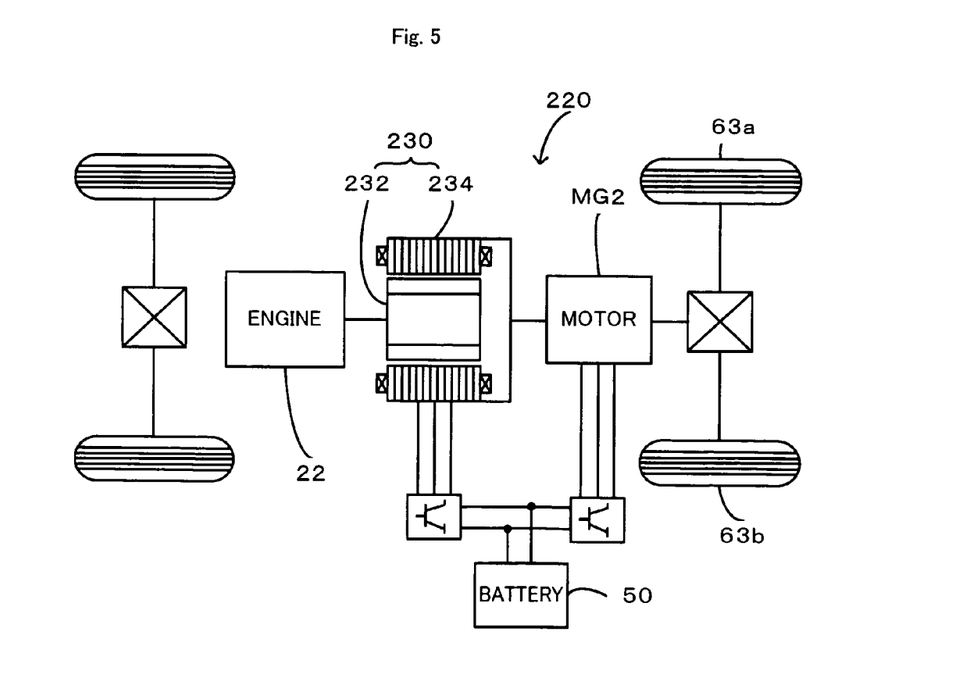
FIG. 5 is a configuration diagram showing the schematic configuration of a hybrid vehicle 220 in another variation.

In the hybrid vehicle 20 of the embodiment, the power of the motor MG2 is subjected to gear change by the reduction gear 35 and is output to the ring gear shaft 32a. In one possible modification shown as a hybrid vehicle 120 of FIG. 5, the power of the motor MG2 may be output to another axle (that is, an axle linked with wheels 64a and 64b), which is different from an axle connected with the ring gear shaft 32a (that is, an axle linked with the wheels 63a and 63b).

In the hybrid vehicle 20 of the embodiment, the power of the engine 22 is output via the power distribution integration mechanism 30 to the ring gear shaft 32a functioning as the drive shaft linked with the drive wheels 63a and 63b. In another possible modification of FIG. 6, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 63a, 63b and transmits part of the power output from the engine 22 to the drive shaft while converting the residual part of the power into electric power.

A description will be made of the correspondence between the primary elements in this embodiment and the primary elements of the invention described in Disclosure of the Invention. In this embodiment, the engine 22 corresponds to the "internal combustion engine." The power distribution and integration mechanism 30 connected to the crankshaft 26 of the engine 22 and the ring gear shaft 32a as the drive shaft connected to axles 65a and 65b via the gear mechanism 60, and the motor MG1 connected to the sun gear 31 in the power distribution and integration mechanism 30 correspond to the "torque output module." The motor MG2 that can deliver and receive mechanical power to and from the ring gear shaft 32*a* corresponds to the "electric motor." The battery 50 that can supply and receive electric power to and from the motors MG1 and MG2 corresponds to the "accumulator unit." The hybrid electronic control unit 70 that executes the process in the step S130 for setting the torque command Tm1* to be the torque for stopping the engine 22 in the crank angle range within which when the system stop instruction is issued in the middle of the operation of the engine 22, the next start operation of the engine 22 is easily carried out, the process in the step S160 for setting the torque command Tm2* for the motor MG2 to be the sum of the cancelling torque Tc that cancels the torque outputted as the reaction force to the ring gear shaft 32*a* and the pressing torque Tp that presses the engagement of the gears in the gear mechanism toward one side, the process in the step S230 for setting the torque command Tm2* to be the torque that decreases from the engine-at-rest torque command Tm2st in proportion to the elapsed time t2 with the proportionality constant of k2 after the engine 22 has stopped, and the process in the step S260 for sending the system stop instruction when the torque from the motor MG2 reaches the threshold value Tref, and the motor ECU 40 that not only performs the switching control on the inverters 41 and 42 in such a way that the motor MG1 is driven according to the set torque command Tm1* and the motor MG2 is driven according to the torque command Tm2* but also turns off the system main relay 53 when the torque from the motor MG2 reaches the threshold value Tref correspond to the "control module." The hybrid electronic control unit 70 that executes the process for sending the system stop instruction to the motor ECU 40 when the time tref has passed, the time tref being the estimated required time from a predetermined timing after the system stop instruction has been issued to the timing when the torque from the motor MG2 gradually decreases to a predetermined torque, and the motor ECU 40 that turns off the system main relay 53 correspond to the "control module." Since the correspondence between the primary elements in this embodiment and the primary elements in the invention described in Disclosure of the Invention is only an example for specifically describing the best mode in which the embodiment carries out the invention described in Disclosure of the Invention, the above embodiment does not limit the elements in the invention described in Disclosure of the Invention. That is, the invention described in Disclosure of the Invention should be construed based on the description therein, and the above embodiment is only a specific example of the invention described in Disclosure of the Invention.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The present invention is applicable to vehicle manufacturing and the like.

The invention claimed is:

1. A vehicle comprising:
an internal combustion engine;
a torque output module that is connected to an output shaft of said internal combustion engine and a drive shaft connected to an axle via a gear mechanism, said torque output module outputting torque, while supplying and receiving electric power and mechanical power and outputting a torque as a reaction force to one of said output shaft and said drive shaft, to the other one of said output shaft and said drive shaft;
an electric motor capable of supplying and receiving mechanical power to and from said drive shaft;
an accumulator unit capable of supplying and receiving electric power to and from said torque output module and said electric motor; and
a control module that, when a system stop instruction is issued in the middle of the operation of said internal combustion engine, controls said internal combustion engine and said torque output module in such a way that the output shaft of said internal combustion engine is stopped within a predetermined rotational position range, controls said electric motor in such a way that the sum of a cancelling torque that cancels the torque outputted as the reaction force to said drive shaft in response to the output of the torque from said torque output module to the output shaft of said internal combustion engine and a pressing torque necessary to press the engagement of the gears in said gear mechanism toward one side is outputted from said electric motor, controls said electric motor in such a way that the torque from said electric motor gradually decreases at least after said internal combustion engine has stopped, and stops the system when the torque outputted from said electric motor reaches a predetermined torque.

2. A vehicle according to claim 1,
further comprising a blocking module for blocking the supply of the electric power from said accumulator unit to said electric motor,
wherein said control module controls said blocking module in said system stop operation in such a way that the supply of the electric power from said accumulator unit to said electric motor is blocked.

3. A vehicle according to claim 1,
wherein said torque output module includes a three shaft-type power input output module that is connected to three shafts, the output shaft of said internal combustion engine, said drive shaft, and a rotating shaft, said three shaft-type power input output module supplying and receiving mechanical power, based on the mechanical power supplied and received to and from two shafts of said three shafts, to and from the remaining shaft, and an electric motor capable of supplying and receiving mechanical power to and from said rotating shaft.

4. A vehicle comprising:
an internal combustion engine;
a torque output module that is connected to an output shaft of said internal combustion engine and a drive shaft connected to an axle via a gear mechanism, said torque output module outputting torque, while supplying and receiving electric power and mechanical power and outputting a torque as a reaction force to one of said output shaft and said drive shaft, to the other one of said output shaft and said drive shaft;
an electric motor capable of supplying and receiving mechanical power to and from said drive shaft;
an accumulator unit capable of supplying and receiving electric power to and from said torque output module and said electric motor; and
a control module that, when a system stop instruction is issued in the middle of the operation of said internal combustion engine, controls said internal combustion engine and said torque output module in such a way that the output shaft of said internal combustion engine is stopped within a predetermined rotational position range, controls said electric motor in such a way that the sum of a cancelling torque that cancels the torque outputted as the reaction force to said drive shaft in response to the output of the torque from said torque output module to the output shaft of said internal combustion engine and a pressing torque necessary to press the engagement of the gears in said gear mechanism toward one side is outputted from said electric motor, controls said electric motor in such a way that the torque from said electric motor gradually decreases at least after said internal combustion engine has stopped, and stops the system when a predetermined time has passed, said predetermined time being the required time from a predetermined timing after said system stop instruction has been issued to the timing when the torque from said electric motor gradually decreases to a predetermined torque.

5. A vehicle according to claim 4,
further comprising a blocking module for blocking the supply of the electric power from said accumulator unit to said electric motor,
wherein said control module controls said blocking module in said system stop operation in such a way that the supply of the electric power from said accumulator unit to said electric motor is blocked.

6. A vehicle according to claim 4,
wherein said torque output module includes a three shaft-type power input output module that is connected to three shafts, the output shaft of said internal combustion engine, said drive shaft, and a rotating shaft, said three shaft-type power input output module supplying and receiving mechanical power, based on the mechanical power supplied and received to and from two shafts of said three shafts, to and from the remaining shaft, and an electric motor capable of supplying and receiving mechanical power to and from said rotating shaft.

7. A method for controlling a vehicle including an internal combustion engine, a torque output module that is connected to an output shaft of said internal combustion engine and a drive shaft connected to an axle via a gear mechanism, said torque output module outputting torque, while supplying and receiving electric power and mechanical power and outputting a torque as a reaction force to one of said output shaft and said drive shaft, to the other one of said output shaft and said drive shaft, an electric motor capable of supplying and receiving mechanical power to and from said drive shaft, and an accumulator unit capable of supplying and receiving electric power to and from said torque output module and said electric motor, the method comprising the steps of: when a system stop instruction is issued in the middle of the operation of said internal combustion engine,
controlling said internal combustion engine and said torque output module in such a way that the output shaft of said internal combustion engine is stopped within a predetermined rotational position range, and controlling said electric motor in such a way that the sum of a cancelling torque that cancels the torque outputted as the reaction force to said drive shaft in response to the output of the torque from said torque output module to the output shaft of said internal combustion engine and a pressing torque necessary to press the engagement of the gears in said gear mechanism toward one side is outputted from said electric motor;
controlling said electric motor in such a way that the torque from said electric motor gradually decreases at least after said internal combustion engine has stopped; and
stopping the system when the torque outputted from said electric motor reaches a predetermined torque.

8. A method for controlling a vehicle including an internal combustion engine, a torque output module that is connected to an output shaft of said internal combustion engine and a drive shaft connected to an axle via a gear mechanism, said torque output module outputting torque, while supplying and receiving electric power and mechanical power and outputting a torque as a reaction force to one of said output shaft and said drive shaft, to the other one of said output shaft and said drive shaft, an electric motor capable of supplying and receiving mechanical power to and from said drive shaft, and an accumulator unit capable of supplying and receiving electric power to and from said torque output module and said electric motor, the method comprising the steps of: when a system stop instruction is issued in the middle of the operation of said internal combustion engine,
controlling said internal combustion engine and said torque output module in such a way that the output shaft of said internal combustion engine is stopped within a predetermined rotational position range, and controlling said electric motor in such a way that the sum of a cancelling torque that cancels the torque outputted as the reaction force to said drive shaft in response to the output of the torque from said torque output module to the output shaft of said internal combustion engine and a pressing torque necessary to press the engagement of the gears in said gear mechanism toward one side is outputted from said electric motor;
controlling said electric motor in such a way that the torque from said electric motor gradually decreases at least after said internal combustion engine has stopped; and
stopping the system when a predetermined time has passed, said predetermined time being the required time from a predetermined timing after said system stop instruction has been issued to the timing when the torque from said electric motor gradually decreases to a predetermined torque.

* * * * *